United States Patent
Tame

(10) Patent No.: US 7,121,609 B2
(45) Date of Patent: Oct. 17, 2006

(54) STOW IN FLOOR SEAT ASSEMBLY WITH MAIN LATERAL DISPLACEMENT

(75) Inventor: Omar D. Tame, West Bloomfield, MI (US)

(73) Assignee: Intier Automotive Inc., Newmarket (CA)

( * ) Notice: Subject to any disclaimer, the term of this patent is extended or adjusted under 35 U.S.C. 154(b) by 36 days.

(21) Appl. No.: 10/527,102

(22) PCT Filed: Sep. 22, 2003

(86) PCT No.: PCT/US03/29560

§ 371 (c)(1),
(2), (4) Date: Mar. 9, 2005

(87) PCT Pub. No.: WO2004/026622

PCT Pub. Date: Apr. 1, 2004

(65) Prior Publication Data
US 2005/0230995 A1 Oct. 20, 2005

(51) Int. Cl.
*B60N 2/12* (2006.01)
*B60N 2/14* (2006.01)

(52) U.S. Cl. .................... 296/65.11; 297/336
(58) Field of Classification Search ............. 296/65.01, 296/65.11, 65.05; 297/333–336
See application file for complete search history.

(56) References Cited

U.S. PATENT DOCUMENTS

| | | |
|---|---|---|
| 2,297,176 A | 9/1942 | Thompson |
| 2,800,947 A | 7/1957 | Thiem |
| 3,637,253 A | 1/1972 | Maule et al. |
| 4,241,893 A | 12/1980 | Koutsky et al. |
| 4,834,452 A | 5/1989 | Goodrich |
| 4,949,931 A | 8/1990 | Fujiwara et al. |
| 5,104,065 A | 4/1992 | Daharsh et al. |
| 5,158,338 A | 10/1992 | Hayakawa et al. |
| 5,498,051 A * | 3/1996 | Sponsler et al. ......... 296/65.03 |
| 5,636,884 A | 6/1997 | Ladetto et al. |
| 5,765,894 A * | 6/1998 | Okazaki et al. .......... 296/65.03 |
| 5,927,789 A | 7/1999 | Mezzadri et al. |

(Continued)

FOREIGN PATENT DOCUMENTS

DE 43 42 438 5/1995

(Continued)

*Primary Examiner*—Dennis H. Pedder
(74) *Attorney, Agent, or Firm*—Clark Hill PLC

(57) ABSTRACT

A seat assembly for supporting an occupant above a floor of an automotive vehicle including a cushion and a riser coupled between the floor of the vehicle and the seat cushion for allowing manual lateral displacement of the seat cushion within the vehicle between a plurality of lateral positions. The seat cushion is pivotally coupled to front legs for movement between a seating position and a forwardly dumped position. The front legs are interconnected to a foot bracket. The foot bracket includes a hook portion slidably engaged with a rod fixedly secured to the floor of the vehicle for manual movement of the seat cushion between the plurality of lateral positions. A cinching hook is pivotally coupled to the foot bracket for movement between locked and unlocked positions. In the locked position, the cinching hook clamps the rod between the hook portion and the cinching hook for resisting lateral displacement of the seat cushion along the rod. In the unlocked position, the cinching hook is subsequently disengaged from the rod to allow lateral displacement of the seat cushion along the rod. A link extends between the seat cushion and the cinching hook for moving the cinching hook between the locked and unlocked positions in response to movement of the seat cushion between the locked and the unlocked positions.

13 Claims, 3 Drawing Sheets

U.S. PATENT DOCUMENTS

| | | |
|---|---|---|
| 6,065,804 A | 5/2000 | Tanaka et al. |
| 6,129,405 A | 10/2000 | Miyahara et al. |
| 6,145,913 A | 11/2000 | Odagaki |
| 6,234,574 B1 | 5/2001 | Hoshihara et al. |
| 6,283,550 B1 | 9/2001 | Vialatte et al. |
| 6,286,886 B1 | 9/2001 | Odagaki |
| 6,435,590 B1 | 8/2002 | Miyahara et al. |
| 6,561,583 B1 * | 5/2003 | Glaser ................. 297/325 |
| 6,955,386 B1 * | 10/2005 | Rhodes et al. ........ 396/65.09 |
| 7,048,330 B1 * | 5/2006 | Daniel ..................... 297/15 |

FOREIGN PATENT DOCUMENTS

| | | |
|---|---|---|
| EP | 0 925 995 | 6/1999 |
| FR | 2 796 344 | 1/2001 |
| WO | WO 00/21778 | 10/1999 |

* cited by examiner

STOW IN FLOOR SEAT ASSEMBLY WITH MAIN LATERAL DISPLACEMENT

BACKGROUND OF THE INVENTION

1. Field of the Invention

The invention relates to a seat assembly for an automotive vehicle, and more particularly, to a riser assembly for manually displacing the seat cushion laterally within the vehicle.

2. Description of the Related Art

Automotive vehicles include seat assemblies for supporting occupants within the vehicle. Seat assemblies include a seat cushion and a seat back operatively coupled to the seat cushion by a recliner mechanism for allowing selective pivotal adjustment of die seat back relative to the seat cushion between a plurality of reclined seating positions. Typically, the seat back is also movable between any one of the reclined seating positions and a generally horizontal, forwardly stowed position to present a load floor surface on the back of the seat back.

It is known in the automotive seating art to mount a riser assembly between the seat cushion and the floor of the vehicle for moving the seat assembly between a seating position with the seat cushion spaced above the floor of the vehicle and a forwardly stowed position with the seat cushion disposed generally forward of the seating position and lying against the floor of the vehicle. It is also known for such a riser assembly to allow movement of the seat assembly between the seating position and a stowed position within a recess in the floor of the vehicle. However, it remains desirable to have a riser assembly that allows movement of the seat assembly between the seating position and a stowed position within a recess substantially laterally offset from the seating position.

SUMMARY OF THE INVENTION

According to one aspect of the invention, a seat assembly is provided for supporting an occupant above a floor of an automotive vehicle. The seat assembly includes a seat cushion. A front leg is pivotally coupled to the seat cushion for movement of the seat cushion between a seating position and a forwardly dumped position. A foot bracket is interconnected to the front leg and has a hook portion slidably supported by a rod fixedly secured to the floor of the vehicle for selective movement of the seat cushion along the rod between a plurality of lateral positions. A cinching hook is pivotally coupled to the foot bracket for movement between a locked position for cinching the rod between the cinching hook and the hook portion of the foot bracket to resist lateral movement of the seat cushion between the plurality of lateral positions and an unlocked position to allow movement of the seat cushion along the rod between the plurality of lateral positions. A link extends between the seat cushion and the cinching hook for moving the cinching hook between the locked and unlocked positions in response to movement of the seat cushion between the seating and forwardly dumped positions, respectively.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
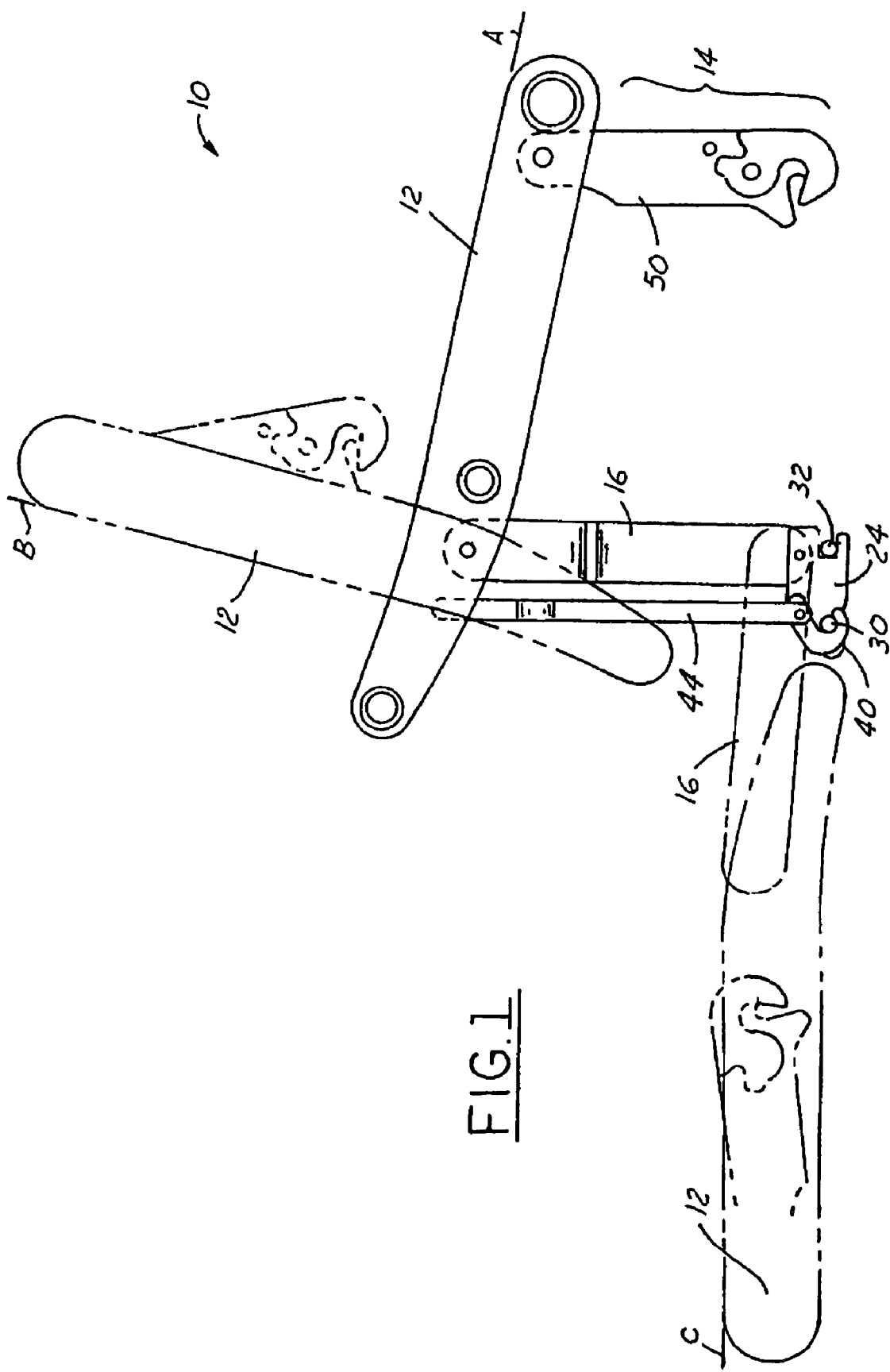
FIG. 1 is a side view of a seat assembly incorporating a riser assembly according to one aspect of the invention.

Referring to the figures, a seat assembly for supporting an occupant above a floor of an automotive vehicle is generally indicated at 10 in FIG. 1. The seat assembly 10 includes a scat cushion 12 and a seat back (not shown) pivotally coupled to the seat cushion 12 for movement between a generally upright seating position and a forwardly folded flat position overlying the seat cushion 12. A riser assembly 14 releasably interconnects the seat assembly 10 to the floor of the vehicle. Described in greater detail below, the riser assembly 14 allows movement of the seat cushion 12 between a seating position A and a forwardly dumped position B with the seat cushion 12 extending generally longitudinally upright from the riser assembly 14. The riser assembly 14 also allows movement of the seat cushion 12 between the forwardly dumped position B and a forwardly stowed position C lying generally flat upon the floor of the vehicle. The riser assembly 14 further allows the seat assembly 10 to be selectively laterally displaced along the floor of the vehicle.

Figure 2:
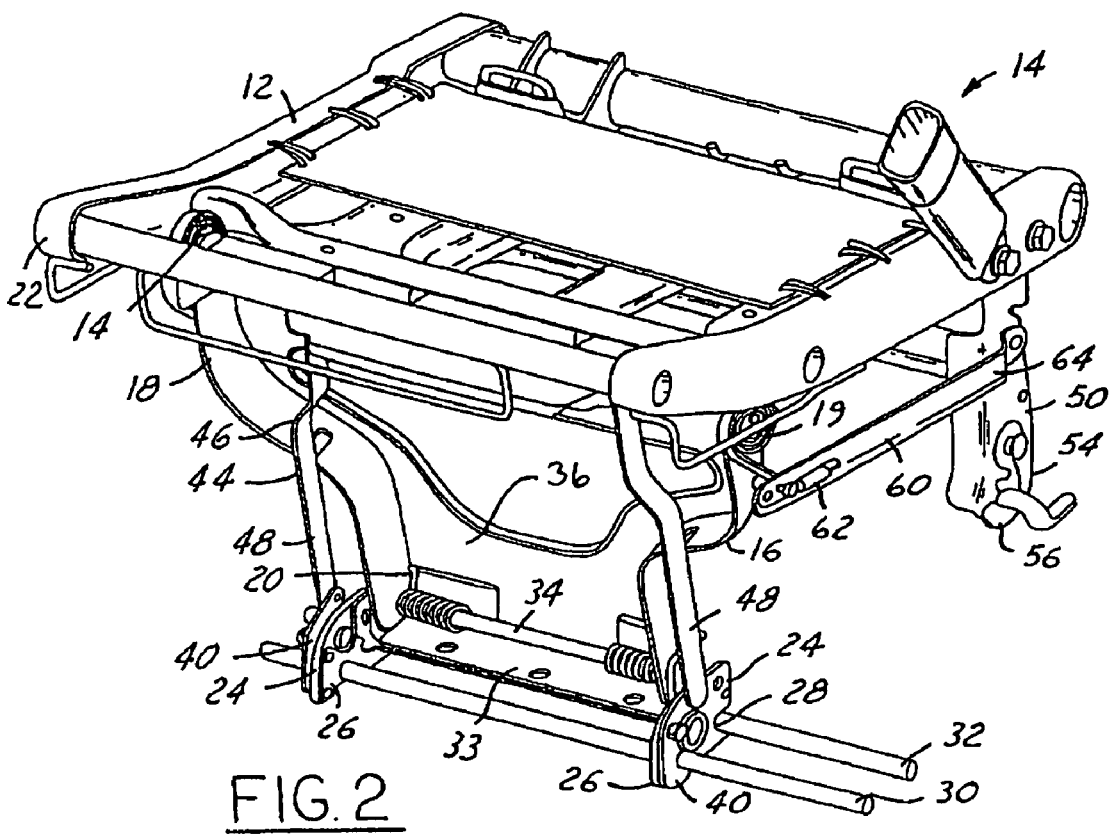
FIG. 2 is a perspective view of the seat assembly.
Figure 3:
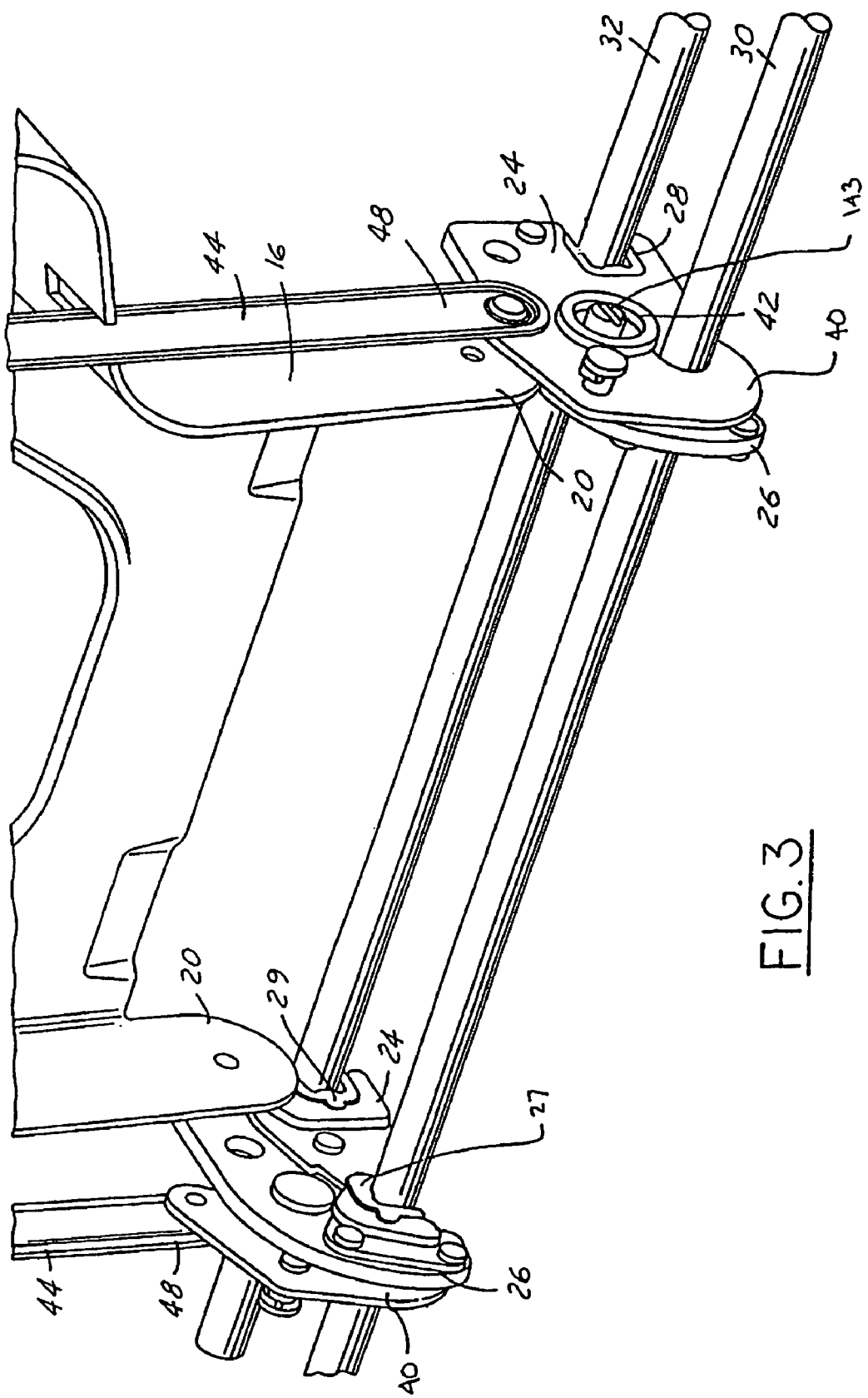
FIG. 3 is an enlarged partial view of the seat assembly.

Referring to FIGS. 2 and 3, the riser assembly 14 includes generally parallel front legs 16 each extending between upper 18 and lower 20 ends. The upper end 18 is pivotally coupled at the location of the first assist spring 19, to a front end 22 of the seat cushion 12 for movement of the seat cushion 12 between the seating A and forwardly dumped B positions. A first assist spring 19 extends between the upper end 18 of each the front leg 16 and the seat cushion 12 for pivotally biasing the seat cushion 12 toward the forwardly dumped position B. The lower end 20 of each front leg 16 is pivotally coupled to a respective foot bracket 24 for movement of the front legs 16 between a support position for supporting the seat cushion 12 in the seating position A, as shown in the FIGS. 2 and 3, and a stowed position extending generally longitudinally along the floor of the vehicle. Each foot bracket 24 extends between front 26 and rear 28 hook portions. The front 26 and rear 28 hook portions are slidably engaged with generally parallel front 30 and rear 32 rods, respectively, for selective movement of said seat cushion 12 between a plurality of lateral positions within the vehicle. The front 30 and rear 32 rods are fixedly secured in a lateral orientation to the floor of the vehicle by any suitable means, such as welding or bolting. The front hook portion (26) comprises an arcuate member adapted to engage an upper portion of the front rod (30). The cinching hook (40) comprises an arcuate member adapted to engage a lower portion of the front rod (30). The front hook portion (26) and cinching hook (40) cooperate to securely engage the front rod (30). The rear hook portion (28) comprises a member having a unshaped slot adapted to engage the rear rod (32) for sliding movement therein. Preferably, rubber or polymeric bumpers 27, 29 are fixedly secured to both the front 26 and rear 28 hook portions for minimizing vibration between the foot brackets 24 and the front 30 and rear 32 rods.

The floor brackets 24 are fixedly secured to opposite sides of a central bracket 33. A second assist spring 34 extends between the lower end 20 of each front leg 16 and the central bracket 33 for biasing the front legs 16 toward the stowed position. A cross member 36 extends laterally in the vehicle between the front legs 16 for stabilizing the movement of the front legs 16 between the support and stowed positions.

A cinching hook 40 is pivotally assembled by a pivot pin 143 to the foot bracket 24 adjacent the front hook 26 for movement between a locked and unlocked position. In the locked position, the cinching hook 40 cooperates with the front hook portion 26 to bindingly cinch the front rod 30 for resisting lateral displacement of the seat assembly 10 along the front 30 and rear 32 rods. In the unlocked position, the cinching hook 40 is substantially disengaged from the front rod 30 to allow manual lateral displacement of the seat assembly 10 along the front 30 and rear 32 rods. A biasing member 42 is coupled between the foot bracket 24 and the cinching hook 40 for biasing the cinching hook 40 toward the locked position.

A link 44 extends longitudinally between an upper end 46 pivotally coupled to the seat cushion 12 and a lower end 48 pivotally coupled to the cinching hook 40 for moving the cinching hook 40 between the locked and unlocked positions in response to movement of the seat cushion 12 between the seating A and forwardly dumped B positions.

The riser assembly 14 also includes generally parallel rear legs 50 extending between upper 52 and lower 54 portions. The upper portion 52 of the rear legs 50 are pivotally coupled to the seat cushion 12 for movement of the rear legs 50 between a support position, as shown in FIGS. 2 and 3, and a stowed position aligned longitudinally along the bottom of the seat cushion 12. The lower portion 54 includes a latch hook 56 for selectively locking the rear legs 50 to a pin fixedly secured to the floor of the vehicle, as known by those of ordinary skill in the art. A link 60 extends between a front end 62 pivotally coupled to one of the front legs 16 and a rear end 64 pivotally coupled to one of the rear legs 50 for automatically moving the rear legs 50 between the support and stowed positions in response to pivotal movement of the scat cushion 12 relative to the front legs 16 between the seating A and forwardly dumped B positions. The effective length of the link 60 shortens as the seat cushion 12 is moved to the forwardly dumped position thereby pulling and pivoting the rear legs 50 to the stowed position.

In use, the front 16 and rear 50 legs extend generally upright in the support position to support the seat cushion 12 in the seating position A. The location of the link 44 associated with the cinching hook in front of the pivot point of the seat cushion relative to the front legs 16 pulls the link 44 to maintain the locked cinch hook 40 when in the seating position. The link 44 pulls the cinching hook 40 toward the locked position against the force applied by the biasing member 42. The front rod 30 is cinched between the cinching hook 40 and the front hook portion 26 preventing manual lateral movement of the seat assembly along the front 30 and rear 32 rods. The bumper 27 is compressed between the front hook portion 26 and the front rod 30 to minimize noise caused by vibration therebetween.

To move the seat cushion 12 between the seating A and forwardly dumped B positions, the latch hook 56 is released from the pin fixedly secured to the floor by suitable releasing means, such as a release lever, as commonly known by those skilled in the art. The seat cushion 12 is then freely pivotally movable between the seating A and forwardly dumped B positions. When the seat cushion 12 is moved to the forwardly dumped position B, the link 60 responsively pulls the rear legs 50 to the stowed position. Movement of the seat cushion 12 toward the forwardly dumped position B is assisted by the first assist spring 19. The link 44 is urged generally downwardly, as viewed in the figures, to move the cinching hook 40 to the unlocked position in response to the pivotal movement of the seat cushion 12 toward the forwardly dumped position B. Thus, while the seat cushion 12 is in the forwardly dumped position B, the seat cushion 12 is manually displaceable along the front 30 and rear 32 rods. Further, while the seat cushion 12 is in the forwardly dumped position B, the seat cushion 12 with the seat back in the flat position is movable to the forwardly stowed position C by pivotal movement of the front legs 16 from the support position to the stowed position. Movement toward the forwardly stowed position C is assisted by the second assist spring 34.

The seat cushion 12 may be returned to the forwardly dumped position B by rotating the front legs 16 toward the support position against the bias of the second assist spring 34. From the forwardly dumped position B, the seat cushion 12 may be pivotally moved to the seating position A against the bias of the first assist spring 19. While the seat cushion 12 is moved to the seating position A, the link 60 responsively urges the rear legs 50 to the support position from the stowed position. The link 44 is urged generally upwardly to move the cinching hook 40 toward the locked position to prevent lateral movement of the seat cushion 12 along the front 30 and rear 32 rods.

While the latch hook 56 is released from the pin fixedly secured to the floor, the seat cushion 12 may be manually laterally displaced along the front 30 and rear 32 rods by lifting the seat cushion 12 partially toward the forwardly dumped position enough to relieve the cinching action upon the front rod 30 between the cinching hook 40 and the front hook portion 26. When a desired lateral position is found, the seat cushion 12 may be allowed to return to the seating position A. The latch hook 56 lockingly engages the pin fixedly secured to the floor to lock the seat cushion 12 in the seating position A.

Figure 4:
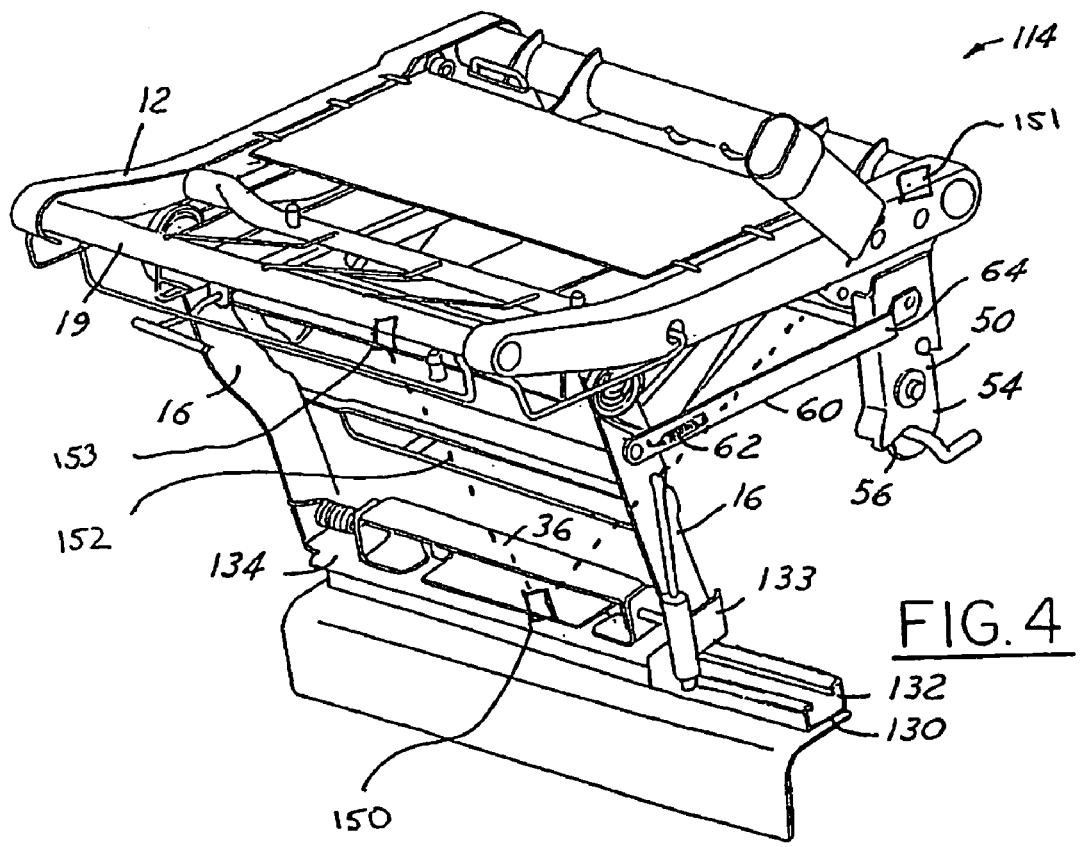
FIG. 4 is a perspective view of the seat assembly according to an alternative embodiment of the invention.

An alternative embodiment of the riser assembly is generally indicated at 114 in FIG. 4. The front legs 16 are pivotally coupled to a support bracket 133 for pivotal movement of the seat cushion 12 between the forwardly dumped position B and the forwardly stowed position C. The support bracket 133 is fixedly secured to a track assembly 130 fixedly secured in a lateral orientation to the floor of the vehicle.

More specifically, the track assembly 130 includes a lower track 132 fixedly secured to the floor of the vehicle and an upper track 134 slidably engaged to the lower track 132 for sliding movement between a plurality of lateral positions within the vehicle. A locking mechanism (not shown) is coupled between the lower 132 and upper 134 tracks for selectively locking the upper track 134 in any one of the plurality of lateral positions. The locking mechanism is manually unlocked by any suitable release mechanism, such as a bowden cable and lever. Alternatively, the locking mechanism is coupled to the seat cushion 12 by a link (not shown), such as a rod or a bowden cable, for selectively unlocking the locking mechanism in response to movement of the seat cushion 12 between the seating A and forwardly dumped position B. The track assembly 130 and the locking mechanism may be of any suitable type commonly known by those of ordinary skill in the art.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly (10) adapted to be coupled to front and rear rods (20, 32) attached to a floor of a vehicle, the seat assembly (10) comprising:
   a seat cushion (12);
   front legs (16) pivotally coupled to the seat cushion (12);
   a foot bracket (24) attached at a lower end (28) of the front legs (16), the foot bracket (24) comprising front and rear hook portions (26, 28) associated with the front and rear rods (30, 32) respectively;
   a cinching hook (40) attached to the foot bracket (24) adjacent the front hook portion (26), the cinching hook (40) and front hook portion (26) cooperating to reversibly engage the front rod (30); and
   a first link (44) extending between the seat cushion (12) and the cinching hook (40) wherein the cinching hook (40) is actuated about the front rod (30) in response to pivotal movement of the seat cushion (12) about the front legs (16).

2. The seat assembly (10) of claim 1 wherein the front hook portion (26) comprises an arcuate member adapted to engage an upper portion of the front rod (30) and wherein the cinching hook (40) comprises an arcuate member adapted to engage a lower portion of the front rod (30), whereby the front hook portion (26) and cinching hook (40) cooperate to securely engage the front rod (30).

3. The seat assembly (10) of claim 1 wherein the rear hook portion (28) comprises a member having a unshaped slot adapted to engage the rear rod (32) for sliding movement therein.

4. The seat assembly (10) of claim 1 further including a first assist spring (19) associated with the front legs (16) and seat cushion (12) for biasing the seat cushion (12) to a forward dumped position.

5. The seat assembly (10) of claim 1 further including a central bracket (33) attached to the foot bracket (24).

6. The seat assembly (10) of claim 5 further including a second assist spring (34) associated with the central bracket (33) and front legs (16) for biasing the front legs (16) towards a stowed position.

7. The seat assembly (10) of claim 1 further including a biasing member (42) associated with the foot bracket (24) and the cinching hook (40) for biasing the cinching hook (40) into engagement with the front rod (30).

8. The seat assembly (10) of claim 1 wherein the front and rear hook portions (26, 28) further include polymeric bumpers (27, 29) associated therewith for minimizing vibration between the foot bracket (24) and front and rear rods (30, 32).

9. The seat assembly (10) of claim 1 further including rear legs (50) pivotally coupled to the seat cushion (12).

10. The seat assembly (10) of claim 9 wherein the rear legs (50) include a latch hook (56) for releasably connecting the rear legs (50) to the floor of the vehicle.

11. The seat assembly (10) of claim 9 further including a second link (60) connected to the front leg (16) at a first end (62) and a rear leg (50) at a second end (64) of the link (60) for pivoting the rear legs (50) between support and stowed positions in response to pivotal movement of the seat cushion (12) between the seating and forwardly dumped positions.

12. The seat assembly (10) of claim 1 further including a cross member (36) extending between the front legs (16) for stabilizing movement of the front legs (16) between support and stowed positions.

13. A seat assembly (10) adapted to be coupled to front and rear rods (20, 32) attached to a floor of a vehicle, the seat assembly (10) comprising:
   a seat cushion (12);
   front legs (16) pivotally coupled to the seat cushion (12);
   a foot bracket (24) attached at a lower end (28) of the front legs (16), the foot bracket (24) comprising front and rear hook portions (26, 28) associated with the front and rear rods (30, 32) respectively;
   a cinching hook (40) attached to the foot bracket (24) adjacent the front hook portion (26), the cinching hook (40) and front hook portion (26) cooperating to reversibly engage the front rod (30); and
   a first link (44) extending between the seat cushion (12) and the cinching hook (40) wherein movement of the seat cushion (12) between seating and forwardly dumped positions corresponds to movement of the cinching hook (40) between engaged and disengaged positions relative to the front rod (30) allowing lateral movement of the seat assembly (10) along the front (16) and rear (50) legs.

* * * * *